US010727635B2

(12) United States Patent
Afshar

(10) Patent No.: US 10,727,635 B2
(45) Date of Patent: Jul. 28, 2020

(54) CURRENT SENSING SWITCH FOR USE WITH PUMPS

(71) Applicant: Reza Afshar, Westlake Village, CA (US)

(72) Inventor: Reza Afshar, Westlake Village, CA (US)

( * ) Notice: Subject to any disclaimer, the term of this patent is extended or adjusted under 35 U.S.C. 154(b) by 0 days.

(21) Appl. No.: 15/372,116

(22) Filed: Dec. 7, 2016

(65) Prior Publication Data

US 2017/0089345 A1 Mar. 30, 2017

Related U.S. Application Data

(63) Continuation-in-part of application No. 14/667,690, filed on Mar. 25, 2015, now abandoned.

(51) Int. Cl.

| | |
|---|---|
| ***H02H 7/00*** | (2006.01) |
| ***H01R 24/70*** | (2011.01) |
| ***H01H 47/22*** | (2006.01) |
| ***H01R 24/68*** | (2011.01) |
| ***H01R 24/78*** | (2011.01) |
| ***F04D 13/06*** | (2006.01) |
| ***F04D 15/02*** | (2006.01) |
| *H01R 103/00* | (2006.01) |

(52) U.S. Cl.

CPC ......... *H01R 24/70* (2013.01); *F04D 13/0686* (2013.01); *F04D 15/0236* (2013.01); *H01H 47/22* (2013.01); *H01R 24/68* (2013.01); *H01R 24/78* (2013.01); *H01R 2103/00* (2013.01)

(58) Field of Classification Search

USPC .................................................. 361/97

See application file for complete search history.

(56) References Cited

U.S. PATENT DOCUMENTS

| | | | | |
|---|---|---|---|---|
| 3,953,777 | A | 4/1976 | McKee | |
| 4,276,454 | A | 6/1981 | Zathan | |
| 4,881,873 | A | 11/1989 | Smith | |
| 4,897,822 | A | 1/1990 | Korten | |
| 5,425,624 | A | 6/1995 | Williams | |
| 6,241,704 | B1 * | 6/2001 | Peterson | A61M 5/14228 604/65 |
| 9,328,727 | B2 * | 5/2016 | Koehl | F04D 15/0088 |
| 2002/0190687 | A1 * | 12/2002 | Bell | B63J 4/006 318/778 |
| 2007/0286737 | A1 * | 12/2007 | Johnson | F04B 51/00 417/36 |
| 2009/0206059 | A1 * | 8/2009 | Kiko | H02J 3/14 218/143 |

(Continued)

FOREIGN PATENT DOCUMENTS

| | | |
|---|---|---|
| EP | 2439413 | 10/2013 |

*Primary Examiner* — Stephen W Jackson

(74) *Attorney, Agent, or Firm* — Louis F. Teran

(57) ABSTRACT

A current sensing switch for use with a pump that is physically separate from the pump and contains a current sensor for measuring the electrical current flowing to the pump as a method of determining whether the pump is operating in low fluid, dry conditions, or with an impeller that has ceased to rotate. When the current drops below or raises above a predetermined value for a predetermined amount of time, the switch electrically disconnects power to the pump and reconnects it periodically to check whether the state of the pump has changed.

14 Claims, 5 Drawing Sheets

(56) References Cited

U.S. PATENT DOCUMENTS

| | | | | |
|---|---|---|---|---|
| 2013/0140912 | A1 | 6/2013 | Nirenberg | |
| 2015/0355254 | A1 * | 12/2015 | Rothbart | G01R 31/02<br>417/63 |
| 2016/0284496 | A1 * | 9/2016 | Afshar | H01H 47/22 |
| 2017/0089345 | A1 * | 3/2017 | Afshar | F04D 15/0281 |

* cited by examiner

CURRENT SENSING SWITCH FOR USE WITH PUMPS

This document claims priority to and is a continuation-in-part to U.S. patent application Ser. No. 14/667,690 filed on Mar. 25, 2015.

BACKGROUND OF INVENTION

Field of Invention

The present invention concerns a switch for use with a pump that prevents the pump from operating in low fluid or dry conditions.

Description of Prior Art

Pumps are the item of choice to remove fluid out from places such as flooded basements, window wells, and swimming pool covers. Pumps are also used in areas where fluid needs to be recirculated. Pumps are typically activated by the push of an electrical switch that is turned on when the pump is submerged in the fluid that needs to be removed or circulated. The pump then sucks the fluid in through a fluid inlet and pushes the fluid out through a fluid outlet to which a hose or pipe is attached that directs the fluid to the desired location.

A problem occurs if the pump is left activated in a condition in which fluid is not present. For example, a pump can be used to pump out fluid in a flooded basement. But once the fluid in the basement has been pumped out, the user often neglects to turn off the pump for an extended period of time. In essence, activating a pump while not submersed in fluid can lead to substantial overheating and damage to the pump motor. To resolve this problem, some pumps include a motor that is sealed in oil with an automatic thermal overload protector device. Thus, when the pump is left activated and not submerged in fluid, the motor begins to overheat and the thermal overload protector device is triggered to deactivate the pump automatically.

Other pumps utilize a pressure switch to measure the fluid pressure around the pump. When the pressure switch does not detect any fluid pressure, it deactivates the pump under the presumption that the pump is not submerged in fluid. Furthermore, as taught by U.S. Pat. No. 4,276,454, coated fluid repellant probes have been used to detect whether the pump is submerged in fluid. U.S. Pat. No. 4,881,873 teaches the use of an ultrasonic field detection system. U.S. Pat. No. 4,897,822, teaches the use of acoustic transducers. U.S. Pat. No. 5,425,624, teaches the use of optical fibers. Thus, a wide range of technologies have been used to address this problem of making sure a pump is not left activated while it is not submerged in fluid or in dry conditions.

Yet other pumps used a control circuit for turning off the power to the pump drive motor when the average current draw from the pump motor decreases below a preset level. This method of measuring the current has proven effective because the current through the pump motor is proportional to the work being done by the pump. Thus, measuring the current can allow a system determine whether the pump is actually pumping fluid or just spinning in air. This concept of measuring the current is taught by U.S. Pat. No. 3,953,777; U.S. Patent Application No. 2013/0140912; and European Patent Application No. EP 2 439 413.

The problem with these devices is that they are electrically and/or physically connected to a pump and cannot be deactivated or adjusted to accommodate varying conditions.

Furthermore, current sensing circuitry is typically built into a specific pump for ease of manufacturing. However, when the circuitry fails, the entire pump becomes unusable.

To address the deficiencies of the inventions mentioned above, what is needed is a device that can not only be electrically disconnected from a pump but can measure the current flow to the pump motor so that it deactivates the pump when the current falls below a predetermined level. Furthermore, a device is needed that can be used with pumps of varying sizes and power. Even further, a device is needed with a current sensing circuitry that can disconnect or deactivate a pump completely so as to prevent the pump from running in low fluid or dry conditions.

SUMMARY OF THE INVENTION

Accordingly, the present invention has been made in view of the above-mentioned disadvantages occurring in the prior art. The present invention is a pump switch with a current sensing circuitry that prevent a pump from operating in low fluid, dry conditions, or with a blocked impeller.

It is therefore a primary object of the present invention to measure the current being fed into the pump as a way to measure the work being done by the pump.

Another object of the present invention is to provide a pump switch that is not built-in or incorporated in a pump.

Yet another object of the present invention to provide a pump switch that can detect false readings.

The above objects and other features and advantages of the present invention, as well as the structure and operation of various embodiments of the present invention, are described in detail below with reference to the accompanying drawings.

DESCRIPTION OF THE DRAWINGS

The accompanying drawings which are incorporated by reference herein and form part of the specification, illustrate various embodiments of the present invention and, together with the description, further serve to explain the principles of the invention and to enable a person skilled in the pertinent art to make and use the invention. In the drawings, like reference numbers indicate identical or functional similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
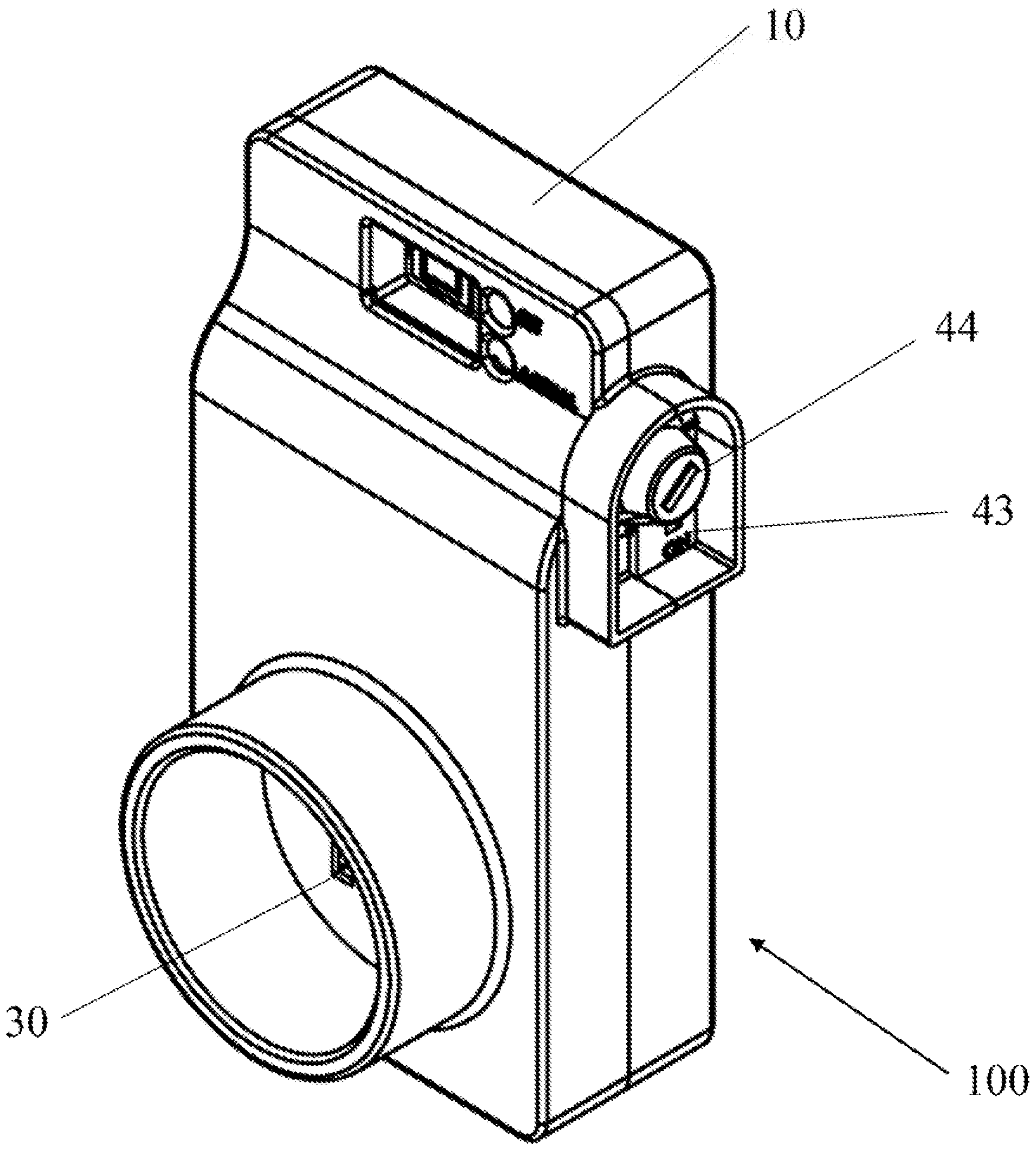
FIG. 1 is a front perspective view of the pump switch of the present invention.
Figure 2:
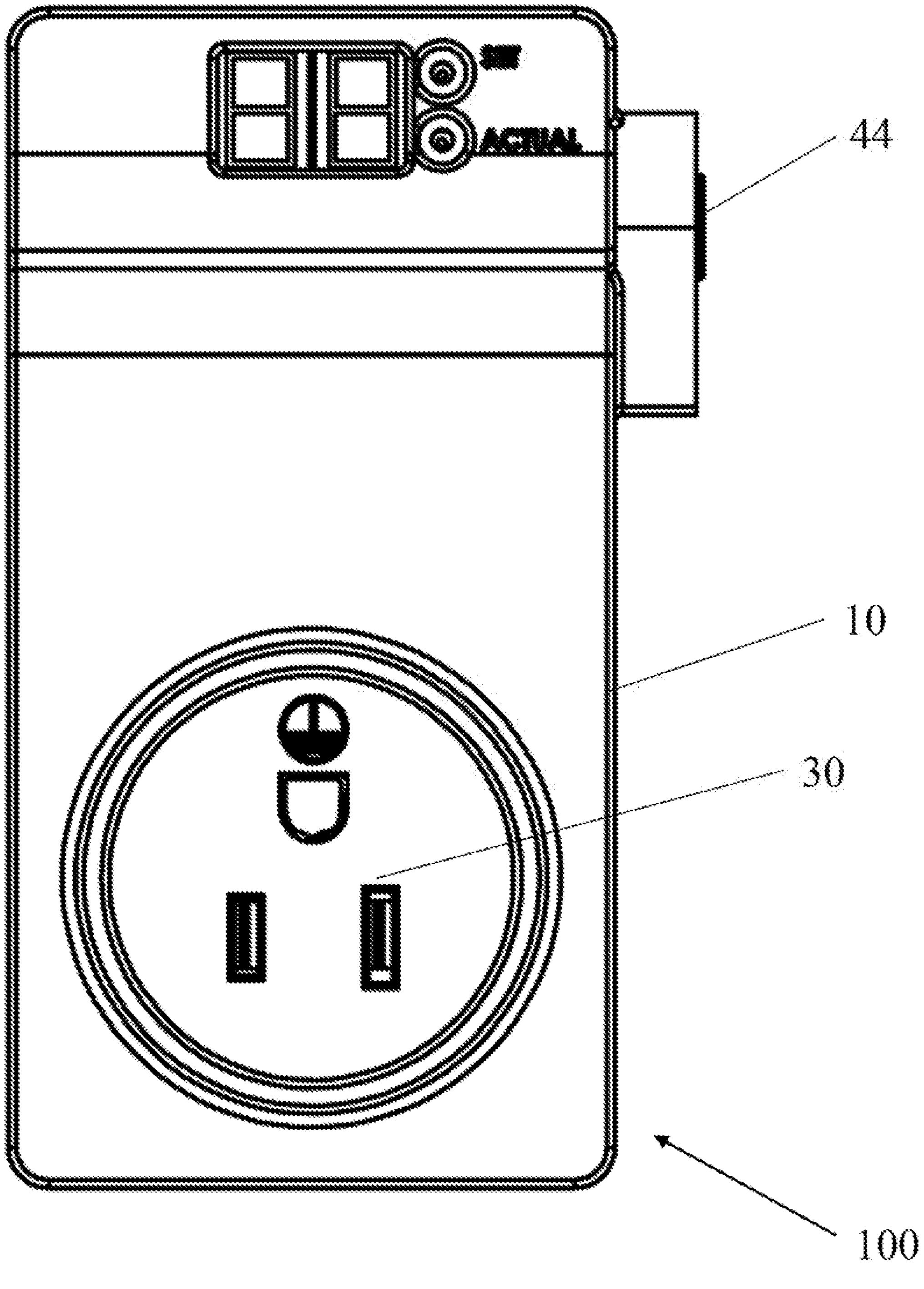
FIG. 2 is a front view of the pump switch of the present invention.

Reference will now be made to the drawings in which various elements of the present invention will be given numerical designations and in which the invention will be discussed so as to enable one skilled in the art and make use the invention.

The present invention comprises a pump switch 100 with a housing 10 having prongs 20 of an electrical plug extending therefrom and an electrical plug socket 30. Inside the housing 10 is a circuit board 40 having a relay that is capable of electrically connecting and disconnecting the electrical plug socket 30 to the prongs 20 of the electrical plug. The circuit board 40 comprises a current sensor, a data center, a controller, a power switch 43, and a current setting switch 44.

Figure 5:
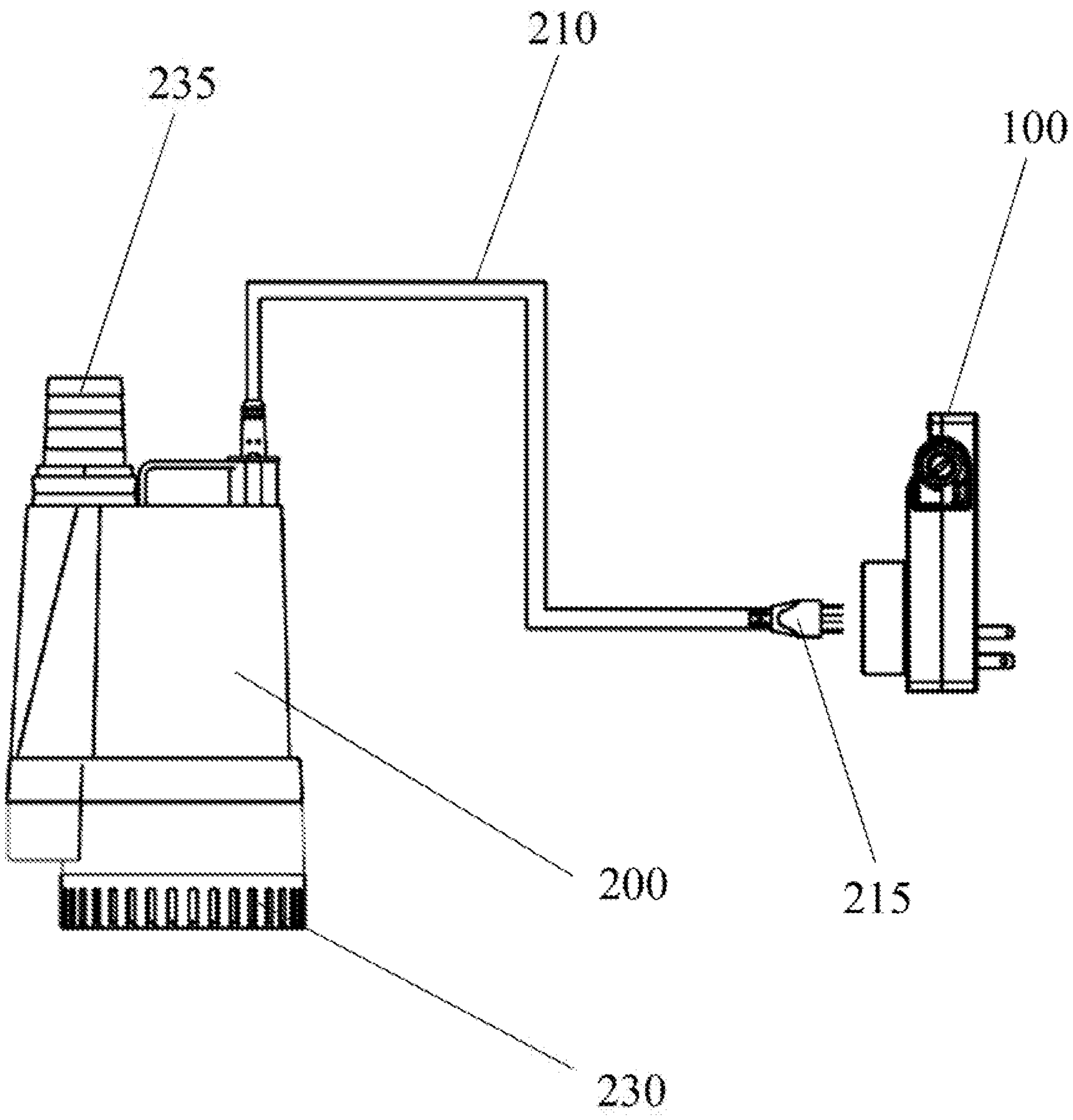
FIG. 5 is a diagram depicting the pump switch of the present invention connected to a pump.

Application of the present invention is with pumps 200. As shown in FIG. 5, a pump 200 has an electrical cord 210 extending therefrom with an electrical plug 215 at the end. The electrical plug 215 is generally plugged in to an electrical plug socket through which electrical current is passed to power up and activate the pump 200. When the pump 200 is activated, a pump motor activates to drive an impeller. When the pump 200 is submerged in fluid, for example, the rotation of the impeller causes the fluid to flow such that the fluid is sucked in through the inlet 230 and pushed out of the outlet 235 of the pump 200.

However, a problem arises when the pump 200 is not submerged in fluid or when the impeller ceases to rotate. This can occur when the pump 200 has finished pumping out the fluid in which it was submerged or when the impeller is blocked. When the pump 200 operates and is not submerged in fluid or the impeller is blocked, the pump motor can overheat and be permanently damaged.

The present invention addresses this problem by electrically connecting the circuit board 40 in-line with the electrical plug socket, thus, the power source. Therefore, rather than connecting the electrical plug 215 directly to the electrical plug socket, the plug 215 is connected to the electrical plug socket 30 in the pump switch 100 of the present invention. The prongs 20 of the electrical plug in the pump switch 100 of the present invention is then connected to the electrical plug socket to which the plug 215 would normally be connected.

The current sensor 41 of the circuit board 40 measures the electrical current passing from the pump switch 100 of the present invention to the pump 200 through the plug 215. This is measured because the electrical current passing to the pump 200 is proportional to the work being done by the pump 200. Thus, measuring the electrical current can allow the pump switch 100 determine whether the pump is actually pumping fluid, just spinning in air, or if the impeller is stuck.

Figure 3:
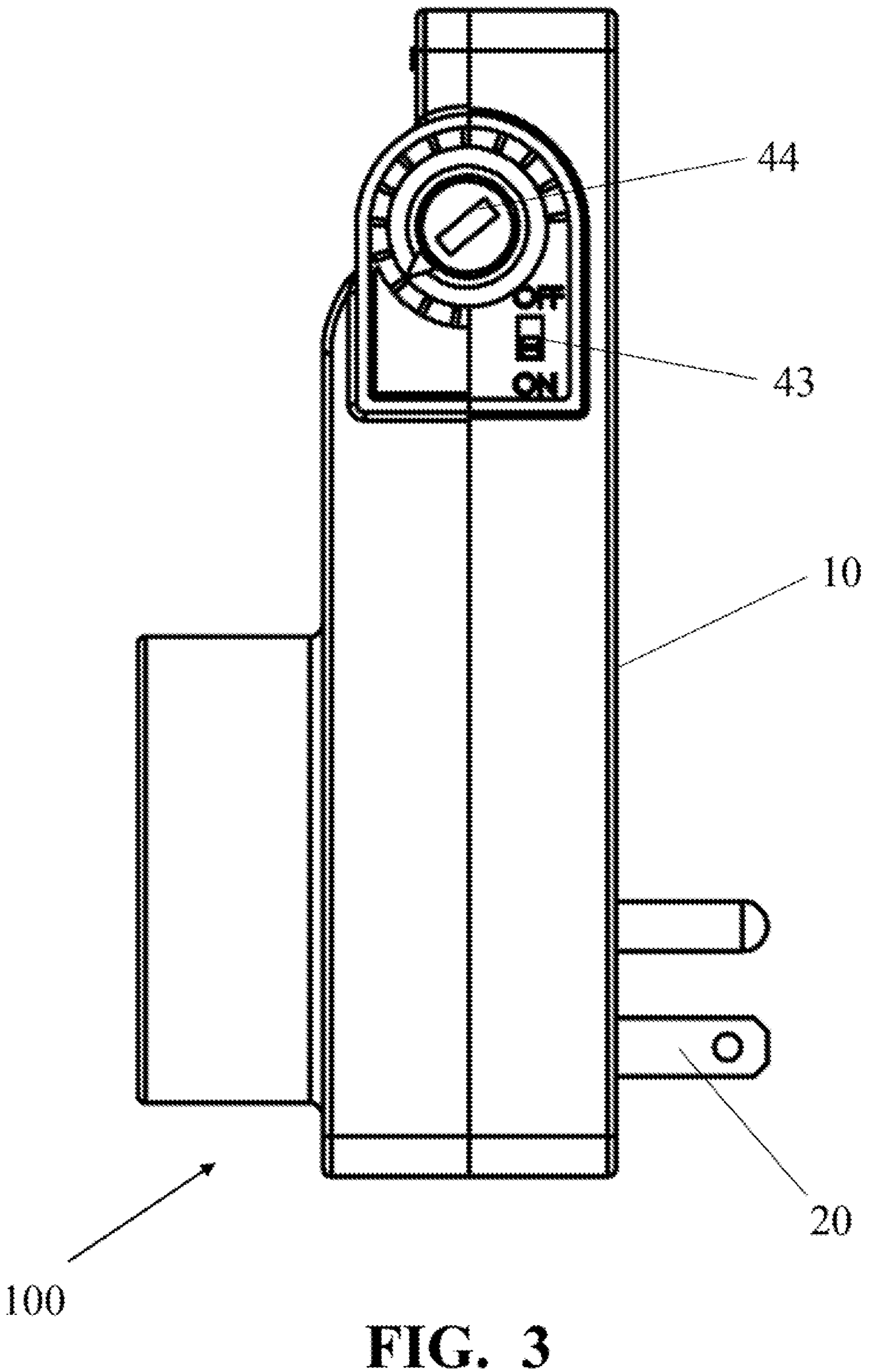
FIG. 3 is a side view of the pump switch of the present invention.

The current setting switch 44 is used to set a lower electrical current limit or a lower current setting value for the pump switch 100. Thus, if the electrical current passing to the pump 200, as measured by the current sensor 41, falls below the lower current setting value, then the pump switch 100 terminates the electrical current flow to the pump 200 by electrically disconnecting the pump 200 from the power source. As shown in FIG. 3, in the preferred embodiment of the present invention, the current setting switch 44 is a dial switch that can be rotated to vary or change the lower current setting value. The current setting switch 44 is readily accessible by the user to vary or change the lower current setting value. Thus, the pump switch 100 of the present invention can be utilized with different types of pumps and fluids of varying viscosity and other characteristics. Depending on the type of pump and type of fluid used, the user can readily change the lower current setting value using the current setting switch 44 to maintain said pump switch 100 within an acceptable operating range. Although the preferred embodiment of the present invention utilizes a dial switch for the current setting switch 44, it is understood that the current setting switch 44 can be a digital switch, a push button switch, a keypad, and the like.

When the user sets the current setting switch 44 to a particular setting, the digital value of the lower current setting value is transmitted and stored within the data center in the circuit board 40. The controller then calculates an upper current setting value based on the lower current setting value and the average electrical current passing to the pump 200 within a predetermined time period as measured by the current sensor 41. Then the digital value of the electrical current passing to the pump 200 is periodically transmitted to the data center and compared with the lower and upper current setting values. If the electrical current is less than the lower current setting value or higher than the upper current setting value, then the pump switch 100 disconnects the pump 200 from the power source, thus, terminating the flow of current to the pump 200. The connecting and disconnecting of the pump 200 from the power source is accomplished by the relay by electrically connecting or disconnecting the electrical plug socket to the prongs.

However, to avoid false readings, the pump switch 100 of the present invention incorporates a delay of a few predetermined seconds. Thus, when the electrical current drops below the lower current setting value or rises above the upper current setting value, the pump switch 100 waits for the few predetermined seconds before disconnecting the pump 200 from the power source. If the electrical current is below or above the lower or upper current setting values for the duration of the few predetermined seconds, then the pump switch 100 disconnects the pump 200 from the power source. This delay allows the pump switch 100 to distinguish between a change in the electrical current caused by actual work done by the pump 200 or by a change caused by other circumstances.

If the pump 200 is disconnected by the pump switch 100 due to a drop in the electrical current below the lower current setting value, then the pump 200 remains disconnected for a first predetermined time period after which the pump switch 100 reconnects the pump 200 and recalculates whether the electrical current is still below the lower current setting value for the few predetermined seconds. If so, then the pump 200 is again disconnected by the pump switch 100 for the first predetermined time period after which the pump switch 100 repeats the cycle. This cycle is repeated by the pump switch 100 every first predetermined time period until the electrical current, as measured by the current sensor 41, is higher than the lower current setting value or until the pump switch 100 is disconnected from its power supply. The repetition of this cycle is an important aspect of the pump switch 100 of the present invention as it ensures that that pump 200 pumps out all of the intended water or fluid. For example, in a situation where a basement of a house is being flooded by water from a faulty plumbing pipe or rain, the rate of water pumped out of the basement by the pump 200 may be greater than the rate of water leaking or flowing into the basement. Thus, at a certain point, all or most of the water may be pumped out of the basement by the pump 200. Thus, it is preferred that the pump 200 be turned off or deactivated. However, the water may not have stopped from leaking or flowing into the basement, the water may flow into the basement at a lower rate than the pump 200 can pump it out of the basement. Thus, if the pump 200 is turned off or disconnected indefinitely, then the water will continue to flood the basement during the indefinite time that the pump is left inoperable. Accordingly, the pump switch 100 of the present invention, periodically turns on the pump 200 to compare the electrical current to the lower current setting value so as to check whether any water or fluid has returned. In the preferred embodiment of the present invention, the pump switch 100 powers up the pump 200 periodically after every first predetermined time period, which can be between 5 to 10 minutes. The connecting and disconnecting of the pump 200 from the power source is accomplished by the relay by electrically connecting or disconnecting the electrical plug socket to the prongs.

Similarly, circumstances may arise in which the inlet 230 of the pump 200 is blocked so as to prevent any water from entering the pump 200 and creating a vacuum therewithin. Alternatively, the impeller of the pump 200 may be physically blocked or trapped. In both scenarios, the impeller may cease its rotation causing the electrical current to spike or rise above the upper current setting value. Allowing the pump 200 to operate when the impeller is trapped or ceases its rotation can cause substantial overheating and damage to the pump 200. As such, the pump switch 100 of the present invention terminates the current flow to the pump 200 when the electrical current passing from the pump switch 100 to the pump 200 is greater than the upper current setting value for the duration of the few predetermined seconds.

If the pump 200 is disconnected by the pump switch 100 due to an increase in the electrical current above the upper current setting value, then the pump 200 remains disconnected for a second predetermined time period after which the pump switch 100 reconnects the pump 200 and recalculates whether the electrical current is still above the upper current setting value for the few predetermined seconds. If so, then the pump 200 is again disconnected by the pump switch 100 for the second predetermined time period after which the pump switch 100 repeats the cycle. This cycle is repeated by the pump switch 100 every second predetermined time period until the electrical current, as measured by the current sensor 41, is lower than the upper current setting value or until the pump switch 100 is disconnected from its power supply. The repetition of this cycle is an important aspect of the pump switch 100 of the present invention as it ensures that the pump 200 pumps out all of the intended water or fluid. For example, in situations when the impeller is blocked, the water may continue to flood a basement. Thus, if the pump 200 is turned off or disconnected indefinitely, then the water may continue to flood the basement even if the impeller is unblocked at a later time. Accordingly, the pump switch 100 of the present invention, periodically turns on the pump 200 to compare the electrical current to the upper current setting value so as to check whether the impeller is still blocked. In the preferred embodiment of the present invention, the pump switch 100 powers up the pump 200 periodically after every second predetermined time period, which can be once or twice per day. The connecting and disconnecting of the pump 200 from the power source is accomplished by the relay by electrically connecting or disconnecting the electrical plug socket to the prongs.

Figure 4:
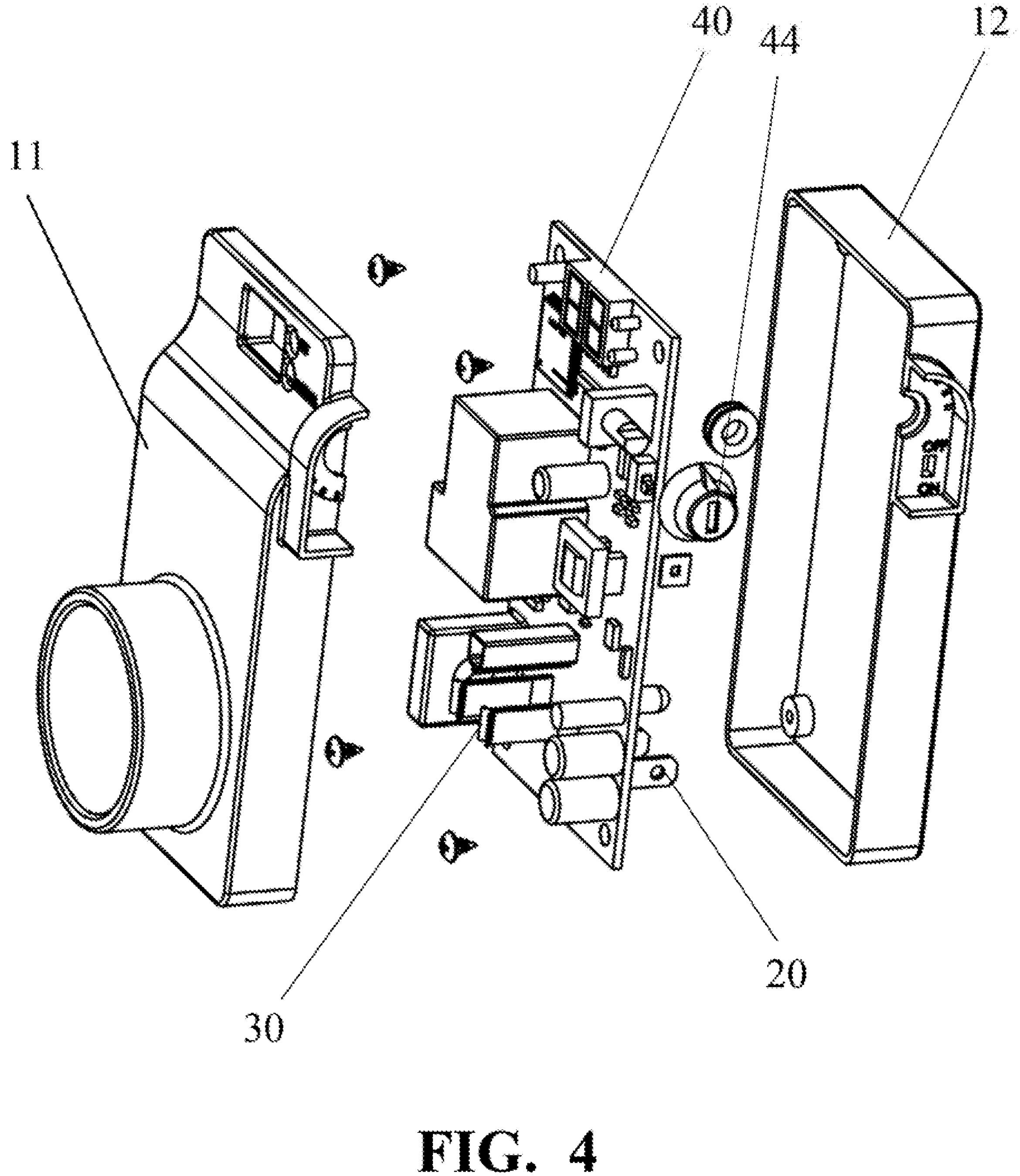
FIG. 4 is an exploded view of the pump switch of the present invention.

The housing 10 of the pump switch 100 comprises a first half 11 and a second half 12 that attach together with the circuit board 40 in between, as shown in FIG. 4. The housing 10 would provide weatherproofing of the pump switch 100 by the manner in which it encloses the circuit board 40 therewithin. The housing 10 would incorporate an o-ring or gasket in between said first half 11 and said second half 12 to protect the circuit board 40 from fluid exposure. Furthermore, a radial seal 13 would be used in the current setting switch 44 to further protect the circuit board 40 from fluid exposure. Finally, the power switch 43 would be encapsulated within a flexible thermoplastic protector to even further protect the circuit board 40 from fluid exposure.

It is understood that the described embodiments of the present invention are illustrative only, and that modifications thereof may occur to those skilled in the art. Accordingly, this invention is not to be regarded as limited to the embodiments disclosed, but to be limited only as defined by the appended claims herein.

What is claimed is:

1. A switch for a pump comprising:

a housing having a plurality of prongs extending therefrom and a plug socket;

a circuit board comprising a controller, a current sensor, a current setting switch, and a relay capable of electrically connecting and disconnecting said prongs to said plug socket;

wherein said current sensor measures an electrical current flowing to said pump;

wherein said current setting switch sets a lower current setting value;

wherein said controller calculates an average value of said electrical current flowing to said pump within a first predetermined time period;

wherein said controller calculates an upper current setting value based on said lower current setting value and said average value;

wherein said controller causes said relay to electrically disconnect said prongs from said plug socket for a second predetermined time period when said electrical current flowing to said pump as measured by said current sensor is less than said lower current setting value, then after said second predetermined time period, said relay electrically re-connects said prongs to said plug socket; and wherein said controller causes said relay to electrically disconnect said prongs from said plug socket for a third predetermined time period when said electrical current flowing to said pump as measured by said current sensor is greater than said upper current setting value, then after said third predetermined time period, said relay electrically reconnects said prongs to said plug socket.

2. The switch for a pump according to claim 1 wherein said housing further comprises a first half and a second half that attach together to enclose said circuit board within a waterproofed cavity.

3. The switch for a pump according to claim 1 further comprising a microprocessor within which said controller is incorporated.

4. The switch for a pump according to claim 1 further comprising a digital display that displays said measurement from said current sensor.

5. The switch for a pump according to claim 1 further comprising a digital display that displays said lower current setting value.

6. The switch for a pump according to claim 1 wherein said current setting switch can readily vary said lower current setting value so as to maintain said pump within an operating range.

7. The switch for a pump according to claim 1 wherein said current setting switch is immediately accessible without effort, tools, or disassembly.

8. A switch for a pump comprising:

a circuit board comprising a current setting switch and a controller capable of electrically connecting and disconnecting said pump from a power supply;

wherein said current setting switch sets a lower current setting value;

wherein said controller calculates an average value of said electrical current flowing to said pump within a first predetermined time period;

wherein said controller calculates an upper current setting value based on said lower current setting value and said average value;

wherein said controller electrically disconnects said pump for a second predetermined time period when said electrical current flowing to said pump is less than said lower current setting value, then after said second predetermined time period, said controller electrically re-connects said pump; and wherein said controller electrically disconnects said pump for a third predetermined time period when said electrical current flowing to said pump is greater than said upper current setting value, then after said second predetermined time period, said controller electrically re-connects said pump.

9. The switch for a pump according to claim 8 further comprising a housing having a first half and a second half that attach together to enclose said circuit board within a waterproofed cavity.

10. The switch for a pump according to claim 8 further comprising a microprocessor within which said controller is incorporated.

11. The switch for a pump according to claim 8 further comprising a digital display that displays said measurement from said current sensor.

12. The switch for a pump according to claim 8 further comprising a digital display that displays said lower current setting value.

13. The switch for a pump according to claim 8 wherein said current setting switch can readily vary said lower current setting value so as to maintain said pump within an operating range.

14. The switch for a pump according to claim 8 wherein said current setting switch is immediately accessible without effort, tools, or disassembly.

* * * * *